Feb. 15, 1966 BUNZI OKAZAKI 3,235,846
DATA PROCESSING SYSTEM
Filed March 15, 1961

INVENTOR.
B. OKAZAKI
BY Greene, Pineles & Durr
ATTORNEYS.

United States Patent Office
3,235,846
Patented Feb. 15, 1966

3,235,846
DATA PROCESSING SYSTEM

Bunzi Okazaki, Tokyo, Japan, assignor to Nippon Electric Company Limited, Tokyo, Japan, a corporation of Japan Filed Mar. 15, 1961, Ser. No. 96,003
12 Claims. (Cl. 340—172.5)

This invention relates to data processing or computer systems utilizing unique coding for the decimal or binary point location in the numbers thereof, and novel means for automatically establishing such point locations throughout the calculations and in the resultant numbers.

There are two conventional methods of handling or coding-in a decimal point, binary point, or a like point in a data processing system, namely, fixed point coding, and floating point coding. Each method has its own advantageous features. In the fixed point coding number system, as applied to an automatic computer, the point position of the numbers handled in the register or in the memory device of the data processing unit of the computer is fixed. It requires a simpler circuit as compared with the floating point coding system. Also, addition and subtraction is usually faster therein, than in the floating point number system computer. Its disadvantage, however, is that the programmer must pay constant attention to the magnitude of the number handled, and that some numbers are not used effectively because of unit determination.

In the floating point coding number system, any number is shown by a row of numbers neglecting the point, and by an additional number indicating a power determination. Compared with the fixed point system, the floating system has more complicated circuitry, but its advantageous features are that the programmer need not pay much attention to the magnitude of the number handled, and that it thus is convenient for complicated scientific calculations whose intermediate value cannot readily be predicted as to magnitude. The floating point coding system, however, becomes complicated in logical control circuits, especially in addition and subtraction. Thus, the time required for computing is rather long compared with the fixed point coding system.

Some computers, employing the fixed point coding system, attempt to obtain the advantages of a floating system by providing added circuit elements so that sufficient numbers may be handled for unit determination. However, the greater complexity and cost of such devices as a whole are disadvantageous.

The present invention relates to a data processing or computer system with combined advantageous features of the two above-mentioned point coding systems, thereby shortening the time for addition and subtraction. The invention eliminates the necessity of counting times of shifting and shifting numbers when adding or subtracting, notwithstanding a broad range of numerical values handled, as in the floating point coding system. However, unlike the floating point coding system, the invention system indicates directly the groups into which classification is made, without indicating the difference of the point position, unit by unit. Further circuit arrangements and means are incorporated in the present invention in the computer system per se, that efficiently and directly utilize the novel and unique number coding system hereof, as set forth in detail hereinafter.

The primary object of the present invention is to provide a novel, efficient and more effective computer system for calculations with large numbers.

Another object of the present invention is a computer system incorporating unique binary or decimal point coding for the numbers.

A further object of the present invention is to provide a computer system retaining the basic advantages of both the fixed and floating point coding number systems, which is more efficient than either yet relatively simpler in circuitry and more economical.

The foregoing and other objects of the invention will be best understood from the following description of an exemplification of the invention, reference being had to the accompanying drawing, wherein.

Figure 1:
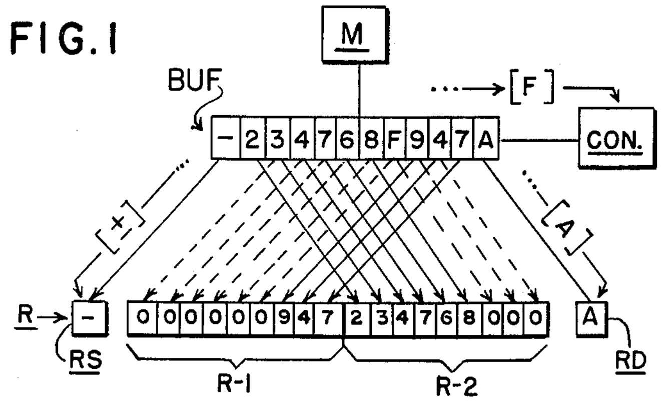
FIG. 1 is a general block diagram of the system of the invention.

The significant features of the conventional fixed and floating binary or decimal point coding number systems will now be explained as background for the unique invention point system. For clarity of presentation, decimal point numbers are used, it being understood that binary point or other numbers may instead be employed.

First, consider a computer A of the fixed decimal point system that can handle numbers with ten figures, and whose absolute values are not greater than 10. For instance, where numbers having these values 3.14159    0.0003512    0.000000386123 . . . (1)

are handled, the construction or the circuits of computer A would omit the decimal points, expressing these numbers respectively as follows:

3141590000    0000351200    0000000386 . . . (2)

In the third number, the tenth and further significant figures below the decimal point are lost. On the other hand, zeros occupy the left section simply for the purpose of unit determination.

Next, as an example of a floating decimal point system computer B, consider a computer in which a number value $n$ is expressed by $m$ and $e$ of the normalized type, as follows:

$$n=m\times 10^e,\ 0.1\leqq|m|<1$$

where $m$ is the group of the significant figures of a number; and $e$ is an exponential part of the number.

The above values (1) are handled by computer B as follows:

31415000 and +1, 35120000 and −3
38612300 and −6 . . . (3)

Consider the addition of two values of the above-indicated three numbers. It is simple by the fixed point computer A, thus 0000351200
0000000386
0000351586 . . . (I)

while by the floating point computer B, $e$'s of two numbers are compared, and first the difference of $e$'s is removed, thus, 35120000 and −3
00038612 and −3

Then, the following sum is obtained, 35158612 and −3 . . . (II)

If the uppermost number is carried upward, another operation is required to make the normalized form. The same applies to a case where the upper number becomes zero by subtraction.

At this point, an example embodying the features of the present invention will be set forth. In a computer C utilizing this invention, assume that in its memory section, the main part of the number is expressed in the form $\underline{D}$ of ten figures in the decimal system. Let a figure of the unit $10^{11}$ or $10^1$ or $10^{-9}$ be placed in the first digit of $\underline{D}$; a figure of the unit $10^{10}$ or $10^0$ or $10^{-10}$, in the second digit of $\underline{D}$; and so on, until finally a figure of $10^2$ or $10^{-8}$ or $10^{-18}$ is placed in the tenth digit of $\underline{D}$. Then, the above three values (1) would be expressed by:

0314159000    0000035120    6123000038 . . . (4)

In the invention method, no significant numbers are lost as in the floating point computer B, case (2). Furthermore, no complicated procedure is required to change the numbers into the normalized form, as in case (3).

Again, considering the previous addition (I) and (II), in the computer C system we have,

```
 0000035120
 6123000038
 ----------
 6123035158        . . . (III)
```

As in the fixed decimal point system, no operation is required to set the unit positions. In an actual adding device for this case, a recirculating register can be utilized to put into the tenth digit, the number carried or borrowed (in the case of subtraction) at the first digit of D. Moreover, to make the multiple operation convenient, a long register may be used in an adding machine. In such case, a register (E), for example, is assumed to consist of two parts $E_1$ and $E_2$, and the digit of $E_1$ or of $E_2$ is made to correspond to one digit in D, expressing a value of the numbers of $10^1$ or $10^{1-10}$ or $10^{1-20}$.

However, without further identification of the values intended, the first number expressed in (4), for example, can be translated into either of the following:

3.14159 0.000000000314159 etc. ...(5)

In the present invention, means are provided that give information for discriminating one from the others. For example, to distinguish between the two values of the numbers shown in (5), a figure, a letter or symbol is added to the number, as indicated by the underlined digit position:

| | | | |
|---|---|---|---|
| | 03141590000 | 03141590009 | (6) |
| or | A0314159000 | X0314159000 | (7) |
| or | 0314159000 | 0314159000* | (8) |

If it is difficult by this method to distinguish significant numbers from those which are not, still further information may be readily added, for instance, to show the position of the least significant digit, thusly:

| | | |
|---|---|---|
| 031415900006 | 031415900096 | (9) |
| 6A034159000 | 6Z0314159000 | (10) |

It is to be noted that two digits are added ahead or behind the ten of D. The added digit 6 indicates that the sixth digit is the least significant digit. Of course, it is feasible to employ a method that also indicates the most significant digit at the same time.

Another version for coding the decimal point by the present invention, is to replace all or part of the zeros which are not significant digits (including 9's in a decimal system adding machine which handles negative numbers with complementary numbers) by other numbers, letters, or symbols. Thus, for example, we have:

| | | | |
|---|---|---|---|
| | 0314159A00 | 0314159Z00 | (11) |
| or | 0314159DDD | B314159CCC | (12) |
| or | *314159DD | *314159Z00 | (13) |

If binary-coded decimal code, or excess-3 code, is used in a four bit binary coded decimal system computer having 16 possible combinations, unused 6 bits may be allocated, for instance, to Z, Z, C, D, and *, in the (11), (12), and (13) codings. In this manner, we embody the features of this invention without increasing the number of memory elements per digit in the memory device, and with the ability to handle number values over a range as wide as that of a floating decimal point system. A computer including only one such digit would save several bits, and provide spaces for scores of power identifying characters. Use of two such digits will provide spaces for hundreds of power identifying characters.

In applying the unique and advantageous coding methods of this invention to a C-type computer system, to be described hereinafter in connection with FIGS. 1 and 2, tabulation of an exemplary number coding method is arranged in Table 1. The coding selected for this table corresponds to the formulations of (11) and (12) above, it being understood that the other and equivalent coding methods hereof described hereinabove, may instead be used. In the table, column (A) is based on (12). If binary decimal codes are used, equivalents of (10), (11), (12), (13), (14) and (15) may be allocated to A, B, C, D, E, F. Table 1, column (B), is a detail of (11); and (C) is an example of practice in which non-significant numbers, zeros, in (B) are omitted to use the memory device more effectively.

With a binary digital computer, since use of elements involves no prolixity and in many cases it is difficult, in a sequence of numbers, to distinguish significant bits from non-significant ones, a method similar to one illustrated in (9) or (10) will be convenient. To express a numerical value in this case, thus, in

```
001101101000000010100111001101111
AAAAABC    D     EFFF              (14)
```

B is a bit to indicate a sign, 24 bits from C to E indicate a value without taking a binary point into consideration, 5 bits of A's indicate the position of the least significant bit which, in this case, is shown as D, the sixth position from C. F's are related to the classification of the decimal point position, indicating this number is either of the following:

```
—10100111001101.101000
—0.000000000010100111001101101000      (IV)
```

If necessary, a part indicating the position of the most significant bit may be added further to the coding of (14).

*Table 1*

| Original Number | (A) | (B) | (C) |
|---|---|---|---|
| 31 41590 00000 | 31415 9EEEE | 314159B000 | 314159BD |
| 3 14159 00000 | D3141 59EEE | 0314159B00 | 314159BC |
| 31415 90000 | DD314 159EE | 00314159B0 | 314159BB |
| 3141 59000 | DDD31 4159E | 000314159B | 314159BA |
| 314 15900 | DDDD3 14159 | A000314159 | A314159 |
| 31 41590 | 9DDDD 31415 | 9A00031415 | 9A31415 |
| 3 14159 | 59DDD D3141 | 59A0003141 | 59A3141 |
| 31415.9 | 159DD DD314 | 159A000314 | 159A314 |
| 3141.59 | 4159D DDD31 | 4159A00031 | 4159A31 |
| 314.159 | 14159 DDDD3 | 14159A0003 | 14159A3 |
| 31.4159 | 31415 9DDDD | 314159A000 | 314159AD |
| 3.14159 | C3141 59DDD | 0314159A00 | 314159AC |
| .31415 9 | CC314 159DD | 00314159A0 | 314159AB |
| .03141 59 | CCC31 4159D | 000314159A | 314159AA |
| .00314 159 | CCCC3 14159 | Z000314159 | Z314 159 |
| .00031 4159 | 9CCCC 31415 | 9Z00031415 | 9Z31415 |
| .00003 14159 | 59CCC C3141 | 59Z0003141 | 59Z3141 |
| .00000 31415 9 | 159CC CC314 | 159Z000314 | 159Z314 |
| .00000 03141 59 | 4159C CCC31 | 4159Z00031 | 4159Z31 |
| .00000 00314 159 | 14159 CCCC3 | 14159Z0003 | 14159Z3 |
| .00000 00031 4159 | 31415 9CCCC | 314159Z000 | 314159ZD |
| .00000 00003 14159 | B3141 59CCC | 0314159Z00 | 314159ZC |
| .00000 00000 314159 | BB314 159CC | 00314159Z0 | 314159ZB |
| .00000 00000 0314159 | BBB31 4159C | 000314159Z | 314159ZA |
| .00000 00000 00314159 | BBBB3 14159 | Y000314159 | Y314159 |

Another method of number coding hereof is as follows:

—234768F947A (15)

—234768A947 (16)

F in (15) indicates a break in the row of digits. If there is no break, F is placed at the end of the row of digits. In the method of (11), non-significant digits were replaced by letters and symbols, but in the method of (15), a particular digital type of space for one letter is reserved. The code letter A at the end of the numbers indicates a classification of the point position. The method of (16) is the same as that of (15), except that its coding is briefer, saving one bit.

In order to handle words of variable lengths, and thereby use the memory device more effectively, the figure at the right of the lowest number's unit, or the figure at the left of the highest figure in this system, or, in the last example of (4), some figures at the right of the lowest unit of the number at the left of the first unit, may be omitted. In this case, in order to show the figures omitted, either numerals, letters or symbols may be added; or different letters and symbols may be used for the methods of (11), (12) and (13). In the table, column (C) illustrates this latter example. Further, in the methods of (6), (7), (8), (9), (10), (14) and (15), the positions at which the attached numerals, letters or symbols are placed, may be changed arbitrarily, or they may be inserted between significant numbers.

In actual addition or subtraction of two numbers having groups widely apart, one value may be neglected by a mere comparison of the groups. Although the comparison of the number groups resembles that for the indices in the floating point system, advantage lies in the fact that, unlike in the floating decimal point system, no shifting of the figures one by one is required in addition or subtraction, and that the number of types of groups is remarkably smaller than those of indices. As is clearly set forth in the above examples, in indicating a number value, in accordance with the present invention, a definite unit in the number, as in the fixed point system, corresponds to a definite element, not one to one, but some of the former to one of the latter, making a recurring expression possible; being classified into several groups by the position of the decimal point. In column (B) of Table I, the group of number values containing A, have this decimal point in the second place to the right, from the left side of the full actual coded expression (when A is located at the right of the lowest digit). The group containing B have their decimal point (when B is at the right of the lowest figure) located two places further towards the right of the full actual coded expression. The group containing Z have their decimal point (when Z is at the right of the lowest figure) eight places towards the left of the full actual coded expression, and starting from the right end thereof. The group containing Y have their decimal point (when Y is at the right of the lowest figure), eighteen places toward the left of the full actual coded expression, and starting from the right end thereof. Furthermore, such classification of the point position enables one to indicate readily the unit determination of a number.

The basis of such other number point coding system for column (B) of Table 1, may be summarized as follows: (a), The latter F (or other desired symbol) designates by its position, where the figures "break" in the ten-digit D representation of the number hereof, to establish the proper group value for the number, i.e., its sequence of figures, without knowledge of the decimal point location therefor. (b), The "classification" letter or symbol, as A, B, Z and Y hereof. One of these symbols, in the ten-digit D representation, is a measure of the "shift registration" of the decimal (or binary) point required. Thus, where B is used in column (B), it corresponds to the multiplier $\times 10^{-2}$ on D. with the point considered at the right end of the ten-digit D; for Z it means D. $\times 10^{-8}$; and for Y, it means D. $\times 10^{-18}$. However, for A, as used herein, it means .D$\times 10^{+2}$, with the point considered at the left side of D. Other, equivalent classification codings may be used, where required, with the symbol designation correspondingly deciphered, in the computer control, when "read" in the coded numbers.

In accordance with the present invention, in the computer or data processing device, the $(na+b)$th figures of a number can be made to correspond to the $a'$th element in each computer section handling the mathematical operation and memory of the numbers, giving it a method to handle $n$. If the register is twice as long, each half is considered to constitute the above part respectively. References $a$ and $b$ are integers determined by the overall construction of the computer device. The integer $b$ can be set to zero. The integer $a$ is generally considered positive, which is equal to or close to the number of letters in a word. The integer $n$ can be handled by placing, in proper location, zero, or a negative integer, or a corresponding letter or symbol.

An exemplary computer system and circuit of the data processing device of the present invention is illustrated in the drawing. The computer of FIG. 1 has a memory section M, a buffer BUF for the memory, a control section CON, and a register R. R is a double-length, simultaneous register whose main parts are R–1 and R–2. The section RS is the part controlled by the sign of the number. The section RD is the part responsive to the unit determination or point classification. FIG. 1 shows the read-out from M to R. The word taken out from memory M is first written into buffer BUF. The form shown in formulation (15) is placed in buffer BUF. Here the position of "break" symbol F is read by control means CON. Of the lines indicated between buffer BUF and section R–1 only those shown in solid lines are shifted from buffer BUF to register section R–1; and of the lines going to R–2, only those shown as solid lines are shifted into register section R–2. The sign of the number is shifted separately to section RS, and the symbol A or equivalent classification code, is shifted separately to section, RD as indicated.

Figure 2:
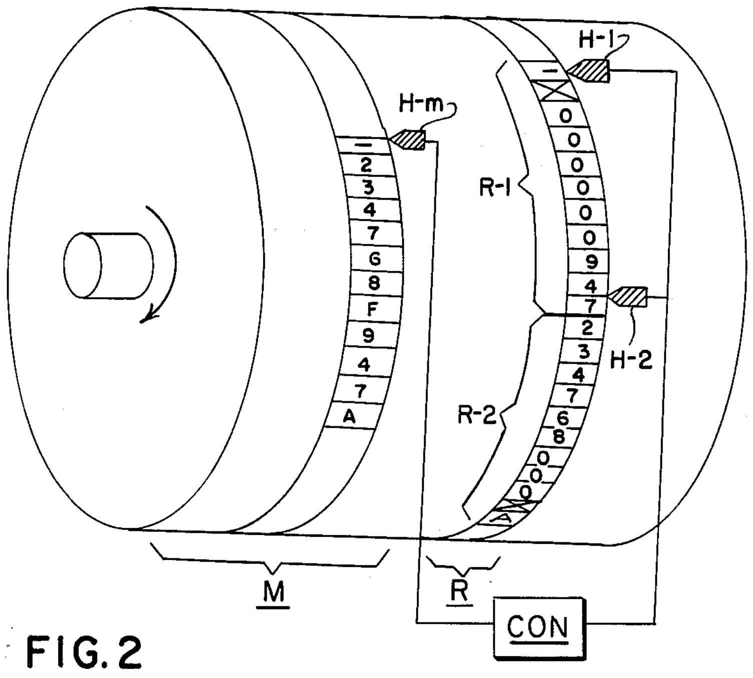
FIG. 2 is a circuit and system diagram of one embodiment of the present invention.

FIG. 2 illustrates a serial drum computer embodying the same operational combination and controls as outlined in connection with FIG. 1, with the sections M, R and CON, the same as in FIG. 1. Memory section M is shown as a magnetic drum. Magnetic core matrices may, of course, be used as well; and other equivalent memory devices known to those skilled in the art. The magnetic head H–$m$ is one of the reading heads of M; and H–1 and H–2 are writing heads to register R. In this case, a reading by head H–$m$ is divided into H–1 and H–2 by control CON, then transmitted to register R and written therein, in a manner understood by those skilled in the art. Register section R–1 is transmitted by head H–1, and register section R–2 is transmitted by head H–2.

It is now evident that simplified control circuitry and reduced circuit elements of the present invention, provide direct and accurate number designation and operational data. The double-length registed R with sections R–1 and R–2, reestablish the proper numeral or figure groupings for the number D, across the break symbol F (see line R in FIG. 1). The RS control for the sign is readily apparent. The shift register control, for decimal or binary point positioning in the number, is directly accomplished by the RD section, responsive to the classification symbol (at end A). Control RD operates the shift register (not shown) in accordance with the particular symbol required.

It will be apparent to those skilled in the art that the novel principles of the invention disclosed herein in connection with a specific exemplification thereof, will suggest various other modifications and applications of the same. It is accordingly desired that in construing the breadth of the appended claims they shall not be limited to the specific exemplification of the invention described herein.

I claim:

1. In a data processing system, a memory section including memory means for storing numbers to be processed as a quantity of number-words of a predetermined quantity of characters, the individual number-words containing the value part of the number-word split into two value portions with a break-in character associated with the two value portions for coding each number's true value sequence, a buffer memory section including write-out means for successively writing-out coded numbers from said memory means for their processing, a system register section having a plurality of stages for receiving at least twice the quantity of characters contained in the number-words, control means responsive to the location and form of the break-in character of each number-word as written into said buffer memory section, and transposing circuit means connected to said control means and to said buffer memory section and operative to transpose the value portions of said number-words into their original value sequence and writing-in such original value sequence into said register section and thereby to integrate the proper value for the number processed in the system numerical output; said memory means being comprised of a plurality of memory word locations for storing a plurality of number words; each memory word location being comprised of a plurality of memory figure positions for receiving an associated figure of the memory word stored in the memory location; each memory figure position being assigned a plurality of discrete values; said break-in character being used to assign one of the discrete values to the figures stored in each memory figure position.

2. In a data processing system, a memory section including memory means for storing numbers to be processed as a quantity of number-words of a predetermined quantity of characters, the individual number-words containing the value part of the number-word split into two value portions with a given break-in character located between the two value portions for coding each number's true value sequence, a buffer memory system section including write-out means for successively writing-out coded numbers from said memory means for their processing, a system register section containing twice the quantity of characters as do the number-words, control means responsive to the location and form of the break-in character of each number-word as written into said buffer memory section, and transposing circuit means connected to said control means and to said buffer memory section and operative to transpose the value portions of said number-words into their original value sequence and writing-in such original value sequence into said register section and thereby to integrate the proper value for the processed number in the system numerical output; said memory means being comprised of a plurality of memory word locations for storing a plurality of number words; each memory word location being comprised of a plurality of memory figure positions for receiving an associated figure of the memory word stored in the memory location; each memory figure position being assigned a plurality of discrete values; said break-in character being used to assign one of the discrete values to the figures stored in each memory figure position.

3. In a data processing system, a memory section including memory means for storing numbers to be processed as a quantity of number-words of a predetermined quantity of characters, the individual number-words containing the value part of the number-word split into two value portions with a break-in character associated with the two value portions for coding each number's true value sequence, the individual number-words also containing a point classification character incorporated in each number-word for coding such number-word as to the shift register operations required to establish the decimal point location in such number-word, a buffer memory section including write-out means for successively writing-out coded numbers from said memory means for their processing, a system register section containing twice the quantity of characters as to the number-words, control means responsive to the location and form of the break-in character of each number-word as written into said buffer memory section, transposing circuit means connected to said control means and to said buffer memory section and operative to transpose the value portions of said number-words into their original value sequence and writing-in such original value sequence into said register section, and a shift register control section including shift means responsive to the particular classification character contained in the coded number-word being processed as written-in said buffer memory section for operating the system shift register in correspondence with such coded number-word and thereby to integrate the proper decimal and value for the number processed in the system numerical output; said memory means being comprised of a plurality of memory word locations for storing a plurality of number words; each memory word location being comprised of a plurality of memory figure positions for receiving an associated figure of the memory word stored in the memory location; each memory figure position being assigned a plurality of discrete values; said break-in character being used to assign one of the discrete values to the figure stored in each memory figure position.

4. In a data processing system, a memory section including memory means for storing numbers to be processed as a quantity of number-words of a predetermined quantity of characters, the individual number-words containing the value part of the number-word split into two value portions with a given break-in character located between the two value portions for coding each number's true value sequence, the individual number-words also containing a point classification character incorporated in each number-word for coding such number-word as to the shift register operations required to establish its decimal point location in such number-word, a buffer memory section including write-out means for successively writing-out coded numbers from said memory means for their processing, a system register section containing twice the quantity of characters as do the number-words, control means responsive to the location and form of the break-in character of each number-word as written into said buffer memory section, transposing circuit means connected to said control means and to said buffer memory section and operative to transpose the value portions of said number-words into their original value sequence and writing-in such original value sequence into said register section, and a shift register control section including shift means responsive to the classification character contained in the coded number-word being processed as written-in said buffer memory section for operating the system shift register in correspondence with such coded number-word, and thereby to integrate the proper decimal point location and value for the number processed in the system numerical output; said memory means being comprised of a plurality of memory word locations for storing a plurality of number words; each memory word location being comprised of a plurality of memory figure positions for receiving an associated figure of the memory word stored in the memory location; each memory figure position being assigned a plurality of discrete values; said break-in character being used to assign one of the discrete values to the figures stored in each memory figure position.

5. In a data processing system as claimed in claim 1, the classification character of each number-word being its end character.

6. In a data processing system as claimed in claim 3, the classification character of each number-word being located at the break-in character position and also operating as the break-in character thereof.

7. In a data processing system as claimed in claim 6, said system further including a positive-negative sign character in the coded number-word, and means for selectively incorporating corresponding information for each number processed in the system numerical output.

8. In a data processing system as claimed in claim 1, said system further including a positive-negative sign character in the coded number-word, and means for selectively incorporating corresponding information for each number processed in the system numerical output.

9. In a data processing system as claimed in claim 2, said system further including a positive-negative sign character in the coded number-word, and means for selectively incorporating corresponding information for each number processed in the system numerical output.

10. In a data processing system as claimed in claim 4, said system further including a positive-negative sign character in the coded number-word, and means for selectively incorporating corresponding information for each number processed in the system numerical output.

11. In a data processing system adapted to handle data to be processed as a quantity of number-words of a predetermined quantity of characters wherein each number-word is comprised of a value part divided into two value portions having break-in character separating the two value portions for coding each number's true value sequence, a memory means for storing said number-words having a plurality of equal length storage sections for each number-word wherein each storage section is comprised of a plurality of storage positions equal in number to the character length of said number-words; each of said storage positions being multivalued; register means for receiving said number-words and having a plurality of storage positions greater in number than the storage positions of said memory sections for receiving number-words having magnitudes substantially greater than the storing capacities of said storage sections each of said register storage positions being single valued and being positioned in chronological descending value from the left-hand end to the right-hand end of said register; control means responsive to the position and identity of said break-in character for selecting the correct one of said multiple values of each memory storage position which is associated with the character stored therein; and shifting means connected between said register means and said memory means for shifting each of said characters comprising the number-word being examined into the storage position having the value which is equal to the selected value of the memory storage position from which the character is being transferred.

12. In a data processing system adapted to handle data to be processed as a quantity of number-words of a predetermined quantity of characters wherein each number-word is comprised of a value part divided into two value portions having break-in character separating the two value portions for coding each number's true value sequence, a memory means for storing said number-words having a plurality of equal length storage sections for each number-word wherein each storage section is comprised of a plurality of storage positions equal in number to the character length of said number-words; each of said storage positions being multi-valued; register means for receiving said number-words and having a plurality of storage positions greater in number than the storage positions of said memory sections for receiving number-words having magnitudes substantially greater than the storing capacities of said storage sections each of said register storage positions being single valued and being positioned in chronological ascending value from the left-hand end to the right-hand end of said register; control means responsive to the position and identity of said break-in character for selecting the correct one of said multiple values of each memory storage position which is associated with the character stored therein; and shifting means connected between said register means and said memory means for shifting each of said characters comprising the number-word being examined into the storage position having the value which is equal to the selected value of the memory storage position from which the character is being transferred.

References Cited by the Examiner

UNITED STATES PATENTS

| | | | |
|---|---|---|---|
| 2,978,679 | 4/1957 | Dieterich | 340—172.5 |
| 3,056,550 | 11/1962 | Horrell | 340—172.5 |

OTHER REFERENCES

Pages 2–01– 2–14, 1959 Publication I: Handbook of Automation, Computation and Control, vol. II, by Grabbe, Ramo and Wooldridge, published by John Wiley and Sons.

Pages 5, 6 and chapter 2, 1958, Publication II: Programming the IBM 650 Magnetic Drum Computer and Data-Processing Machine by R. V. Andree, published by Holt, Rinehart and Winston, Inc.

ROBERT C. BAILEY, *Primary Examiner.*

STEPHEN W. CAPELLI, MALCOLM A. MORRISON, *Examiners.*

W. M. BECKER, *Assistant Examiner.*